United States Patent
Brännström et al.

[11] Patent Number: 5,868,083
[45] Date of Patent: Feb. 9, 1999

[54] METHOD AND DEVICE FOR FEEDING FUEL INTO A FLUIDIZED BED

[75] Inventors: Roine Brännström; Carl Johan Sandelin, both of Finspong, Sweden

[73] Assignee: ABB Carbon AB, Finspang, Sweden

[21] Appl. No.: 809,491

[22] PCT Filed: Sep. 29, 1995

[86] PCT No.: PCT/SE95/01107

§ 371 Date: Mar. 27, 1997

§ 102(e) Date: Mar. 27, 1997

[87] PCT Pub. No.: WO96/10151

PCT Pub. Date: Apr. 4, 1996

[30] Foreign Application Priority Data

Sep. 29, 1994 [SE] Sweden ................................. 9403268

[51] Int. Cl.⁶ .................... F23G 5/00; F23D 1/00; F23L 1/00
[52] U.S. Cl. .................... 110/245; 110/243; 110/244; 110/263; 110/347; 110/348
[58] Field of Search ............... 110/101 CF, 101 CD, 110/101 R, 102, 104 R, 105, 106, 118, 243, 244, 245, 263, 251, 346, 347, 348; 431/7, 170; 432/14, 15, 58; 122/4 D

[56] References Cited

U.S. PATENT DOCUMENTS

| | | | |
|---|---|---|---|
| 4,182,245 | 1/1980 | Stewart et al. | 110/101 CF |
| 4,297,321 | 10/1981 | Beranek . | |
| 4,338,283 | 7/1982 | Sakamoto et al. | 422/112 |
| 4,377,072 | 3/1983 | Campbell, Jr. et al. | 60/682 |
| 4,435,148 | 3/1984 | Moss | 431/7 |
| 4,445,844 | 5/1984 | Matthews | 431/170 |
| 4,460,330 | 7/1984 | Asai et al. | 431/170 |
| 4,517,162 | 5/1985 | Moss | 422/142 |
| 4,530,290 | 7/1985 | Comparato | 110/245 |
| 4,593,630 | 6/1986 | Teigen . | |
| 4,655,147 | 4/1987 | Brännström et al. . | |
| 4,829,912 | 5/1989 | Alliston et al. | 110/345 |
| 4,877,397 | 10/1989 | Tatebayashi et al. | 432/106 |

FOREIGN PATENT DOCUMENTS

| | | |
|---|---|---|
| 29 23 250 | 2/1981 | Germany . |
| 31 12 406 | 10/1982 | Germany . |
| 35 23 256 | 1/1987 | Germany . |
| 1183-781-A | 10/1985 | U.S.S.R. ..................... 431/7 |

OTHER PUBLICATIONS

Derwent s Patent Abstracts, Abstract of SU 1248–910–A, "Chamber Feed For Pneumatic Transportation Plant"–Aug. 1986.

*Primary Examiner*—Ira S. Lazarus
*Assistant Examiner*—Ljiljana V. Ciric
*Attorney, Agent, or Firm*—Pollock, Vande Sande & Amernick

[57] ABSTRACT

To a fluidized combustor bed there is passed particulate fuel via a fuel flow distributor which comprises a vessel for receiving a particular fuel from a fuel storage. The fuel is fed into the vessel of the fuel flow distributor from the fuel storage, whereupon the fuel is fluidized in a bed above a bed bottom in the vessel of the fuel flow distributor. The fuel flow distributor comprises at least two feed pipes with associated inlets located adjacent the surface of the bed in the fuel flow distributor, where fluidization gas which leaves the vessel via a feed pipe feeds out fuel to at least one nozzle is in the bed of the combustor. Additional gas is supplied to the feel pipes at the inlets thereof, such that the flow of fuel through an individual feel pipe can be controlled by controlling the gas flow supplied to the inlets of the respective feed pipes.

14 Claims, 4 Drawing Sheets

METHOD AND DEVICE FOR FEEDING FUEL INTO A FLUIDIZED BED

TECHNICAL FIELD

The present invention relates to a fuel flow distributor by means of which dry particulate fuel is fed into a fluidized bed with the aid of nozzles in the bed and wherein the fuel feed to the bed may be controlled in that the feeding from each nozzle into the bed is, to a certain extent, individually controlled.

BACKGROUND OF THE INVENTION

Into a fluidized bed in a combustor, for example an FBC or a PFBC power plant, there is fed particulate fuel in a dry state via a large number of feed nozzles. The fuel may also be fed in by adding liquid, whereby a paste is obtained. Paste feeding is not discussed in this specification.

A large number of nozzles is justified by the need to distribute the fuel in the bed as efficiently as possible thereby achieve complete combustion of the fuel.

Usually, the fuel is fed from a storage container to the nozzles by means of mechanical and/or pneumatic conveyors, which entails a number of parallel rotary vane feeders, or other devices, for controlling the fuel flow to the nozzles.

Rotary vane feeders, or other feeding devices, are expensive, so the aim is to reduce the need of such devices. This may mean that two parallel rotary vane feeders may, for example, be arranged to feed two separate systems of supply conduits with a network of feed nozzles associated with each such system. A natural disadvantage of such a system with two feeding systems which by means of, for example, rotary vane feeders feed fuel more or less independently of each other is the difficulty of being able to adjust the quantity of fuel individually for each nozzle in the fluidized bed. To desire individual control of each nozzle may appear to be contrary to what has been said above regarding the importance of achieving an even distribution of a fuel fed into the bed. The main principle, however, is to attain the good distribution of the fuel. However various factors may contribute to the desire to control the flow of fuel fed into the bed individually for each nozzle. Such factors may be the vicinity to combustor walls and heat-absorbing tube surfaces, differences in mixing and fluidization patterns at or near the nozzle, etc.

U.S. Pat. No. 4,655,147 discloses a method of achieving a simplified pneumatic feeding system of particulate fuel to a fluidized bed. This is achieved by arranging a fuel distributor downstream of a flow-controlling feeding device. The aim of this fuel distributor, placed near the combustor, is to reduce the number of supply conduits between the flow-controlling feeding device and nozzles in the bed. Also, a device according to this prior art suffers from the disadvantage that the flow of fuel cannot be controlled separately from each nozzle.

It is known in the prior art to feed the particulate fuel to the fuel flow distributor in the form of a separate vessel, so that fuel is fluidized to a bed by supplying fluidizing air via a perforated bed bottom, on which the bed of fuel rests. Above the surface of the fuel bed, there is a freeboard. At a bed surface, a number of discharge pipes from the fuel flow distributor are arranged. These discharge pipes lead to the fluidized bed in a combustor. These pipes then serve as feed pipes to the bed of the combustor, the feed pipes being provided with nozzles at their orifices into the fluidized bed. The principle of such a described fuel flow distributor is that fuel in fluidized state, when the bed surface reaches the discharge pipe, will be fed out of the fuel flow distributor and thus be fed into the combustor bed at these discharge pipes. Also in this case, it is not possible to control the feed quantity for each nozzle in the bed individually.

The object of the invention is to feed and control, by means of a fluidized fuel flow distributor, and in an inexpensive manner, the distribution of fuel to a large number of feed points in a fluidized bed, i.e., a so-called FBC, for combustion of the fuel.

SUMMARY OF THE INVENTION

The invention relates to a method and a device for feeding and controlling the distribution of a particulate fuel to a fluidized combustor bed in a combustor, which is supplied with fuel via a fuel flow distributor comprising:

a vessel for receiving a particulate fuel from a fuel storage, from where the fuel is fed into the vessel and fluidized in the vessel in a bed above a bed bottom in the fuel flow distributor, at least two feed pipes with associated inlets located close to the surface of the bed in the fuel flow distributor where fluidization gas, leaving the vessel via the feed pipe, feeds out fuel to at least one nozzle in the combustor bed, and gas is supplied to the feed pipe at the inlet thereof, whereby the flow of fuel can be controlled by controlling the gas flow supplied to the inlet of the feed pipe.

The level of the inlets of the feed pipes in the vessel of the fuel flow distributor will be determined by the level of the bed surface in the vessel since new fuel fed into the bed when the surface of the bed has already reached the level of the inlets of the feed pipes automatically results in fuel above this level accompanying fluidizing air escaping from the vessel via the feed pipes. In this way, the total outflow of fuel from the fuel flow distributor is determined by the quantity of fuel fed to the fuel flow distributor.

All feed pipes open out into an FBC, which means that the pressure drop across each individual feed pipe is equally great. By adding extra gas close to the inlet of a feed pipe, the pressure drop across this pipe increases and the suction of particulate material to this very pipe decreases. In this way, the flow of fuel through each individual feed pipe and, as a result thereof, the flow of fuel at the associated fuel feed nozzle in the combustor can be individually controlled.

In the present invention, the additionally supplied air is utilized to adjust the distribution of fuel between the different fuel feed nozzles. Without this arrangement, differences in fuel flow within the range of ±10% between different nozzles may occur. This is due to the conditions (pressure, flows, etc.) which prevail locally in the bed at each nozzle. By means of a device according to the invention, the fuel distribution in the bed may be improved so that acceptable differences in fuel flows within ±2% are obtained.

A considerable advantage achieved with the method according to the invention is that the distribution of fuel fed into the fluidized bed is considerably improved. The fuel is more uniformly fed in. This, in turn, leads to other good results. As an example the maximum working temperature of the bed is limited by the highest local temperature in the bed. If local temperature deviations can be reduced, the working temperature of the whole bed can thus be increased, which is possible with the proposed method.

An additional advantage obtained with the described method is that the feeding of additional material into a feed pipe which is subjected to a dust plug is prevented, since the additional air moves away particles from the inlet to the pipe which has been plugged.

The combustion process may further require that the flows to each nozzle can be controlled, since conditions in the bed require this. Also in this case, a control of different flows according to the invention is useful.

A valve which controls the gas flow supplied to the inlet of each individual feed pipe is used for the described control of fuel flow.

DESCRIPTION OF THE PREFERRED EMBODIMENTS

The invention will be described in greater detail in a number of embodiments with reference to the accompanying drawings.

Figure 1:
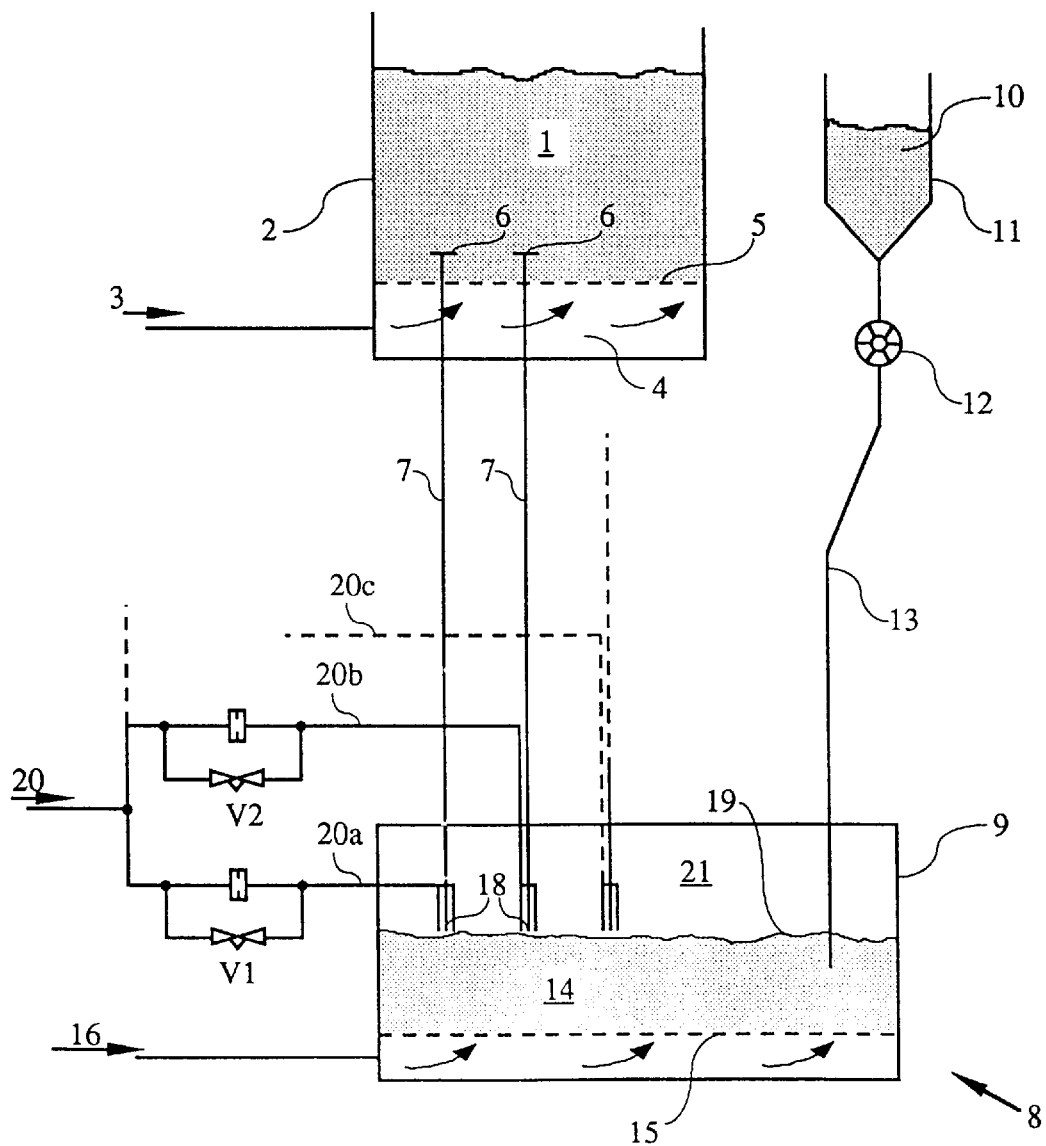
FIG. 1 schematically shows a present invention fuel flow distributor in which the fuel flow distributor receives fuel from a storage and feeds fuel into a fluidized bed (an FBC) in a combustor. Gas is supplied to the feed pipes via valves.

The device and the method according to the invention are intended for use during combustion of a particulate fuel in a fluidized bed in a power plant. The fluidized bed may be under atmospheric pressure, an FBC bed; or under pressure, a PFBC bed. FIG. 1 shows, for example, that combustion of fuel takes place in a fluidized bed 1 in a combustor 2 in a power plant. The fluidizing air to the combustor is supplied at 3 to an air distribution space 4 below a first bed bottom 5, on which the fluidized bed 1 of the combustor rests. For feeding and distribution of particulate fuel in a dry state, two nozzles 6 are arranged at the outlet of the feed pipe 7 here but normally 10 to 150 feed pipes are present with associated nozzles.

A fuel flow distributor 8, hereinafter only referred to as a distributor, is also illustrated in FIG. 1. The distributor comprises a closed vessel 9 to which fuel is fed from a fuel storage means 10 in a container 11 for storage of fuel. Fuel from the storage means 10 is transported via a flow-controlling conveyor 12, for example a rotary vane feeder, via a conduit 13 to the distributor 8. Fuel fed to the vessel 9 builds up a second bed 14, here referred to as distribution bed, on a second bed bottom 15. This distribution bed is fluidized by means of air or gas introduced at 16 in the figure. The above-mentioned feed pipes 7 have their inlets 18 disposed at a certain level in the vessel 8, whereby fuel fed via conduit 13 to the distributor 8 will build up a bed 14, the surface of which can only rise to a height which is at a level with the level of the inlets 18 at the feed pipes 7. When additional fuel is fed in, fluidization gas leaving the closed vessel 9 via the feed pipes 7 brings along fuel which tends to exceed the level of the inlets 18 of the pipes 7, fuel then being fed by means of the fluidizing air in the fuel flow distributor 8 via the feed pipes 7 and the nozzles 6 to the fluidized first bed 1 in the combustor 2 for combustion. The level of the feed pipes 7 consequently adjusts the level of the bed surface 19 in the distribution bed 14.

According to the invention, additional gas is supplied at 20 to the inlet 18 of each feed pipe 7. This extra gas is supplied to each individual inlet 18. The quantity of gas supplied to each inlet 18 is controlled by means of control valves $v_1$, $v_2$ etc. in the respective conduit 20a, 20b, etc. which conduct extra (additional) air to the inlets 18.

In the schematic representation in FIG. 1, the real proportions between the beds in the fuel flow distributor and the combustor are not shown. Normally, the combustor bed 1 is of considerably larger size than the bed 14 in the fuel flow distributor 8.

Figure 2:
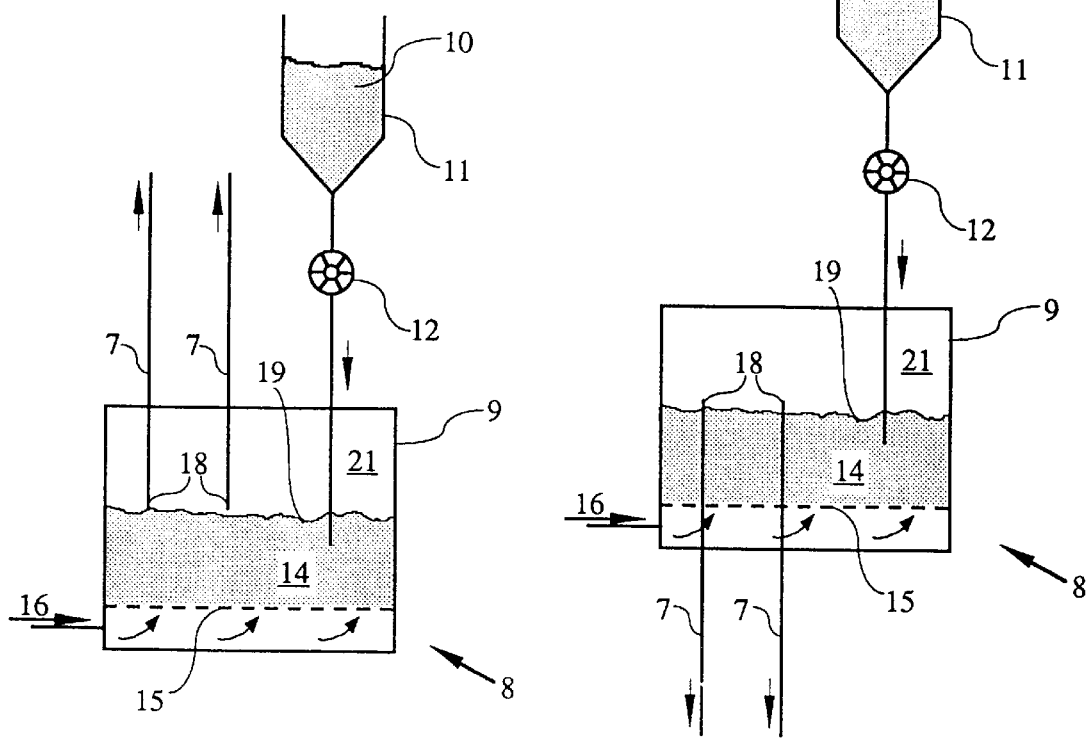
FIG. 2 illustrates different ways of orienting the inlets of the feed pipes at the bed surface in the fuel flow distributor.
Figure 2:
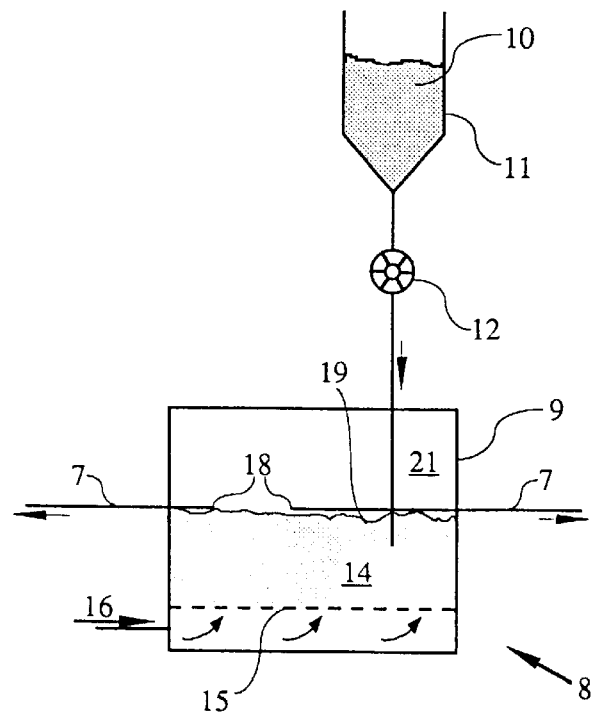

FIG. 2 shows that the orientation of the feed pipes 7 vis-a-vis the vessel 9 in the distributor 8 can be oriented in several alternative ways. The lefthand picture shows an alternative wherein the inlets 18 face downwardly toward the bed surface 19. The picture shown an alternative embodiment wherein the inlets are oriented so that the openings thereof face upwardly toward a freeboard 21 above the bed surface 19. The righthand picture indicates that the inlets may also be directed in a lateral direction and lie on a level with the bed surface.

Figure 3:
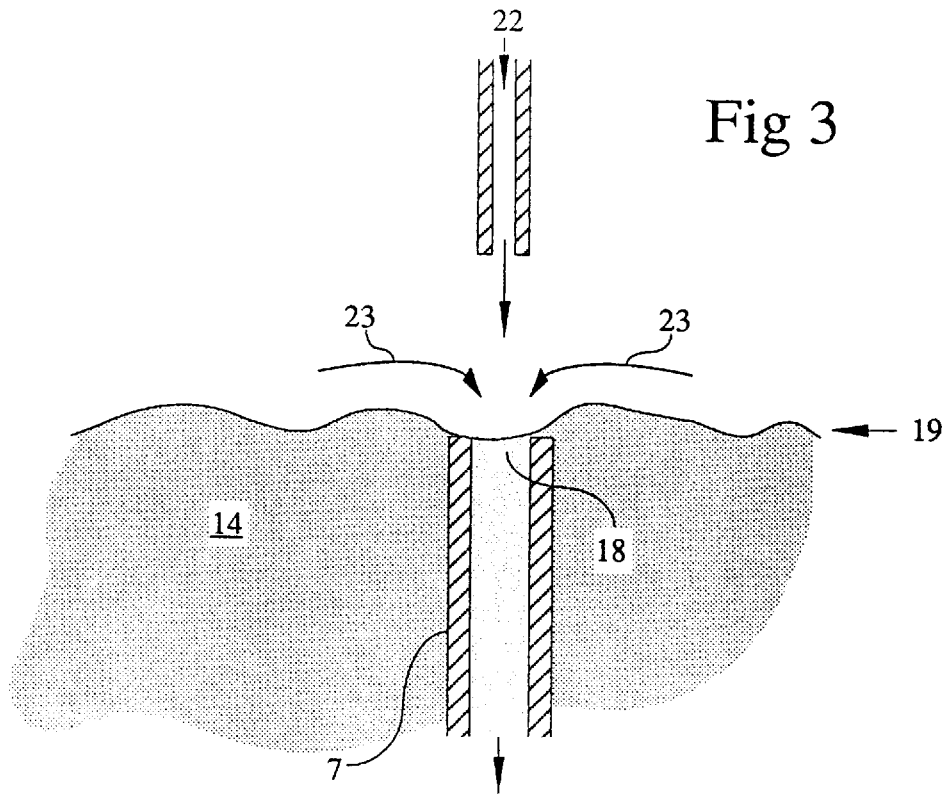
FIGS. 3 and 4 illustrate a couple of alternatives to the method of supplying gas to a feed pipe at the bed surface in the fuel flow distributor.

FIG. 3 shows an example of how the injection of extra (additional) gas 22 is performed at an inlet 18. In this example, a feed pipe 7 is used with its associated inlet 18 facing upwardly. The gas is injected toward one of the feed points of the distributor 8, that is, towards the opening of the inlet 18. The arrows 23 illustrate fluidization gas and fuel from the bed 14 which, from the bed surface 19, are fed via the feed pipe 7.

The extra gas 22 may be supplied to the inlet 18 of a feed pipe 7 by designing a pipe for the supply of extra gas 22 to constitute a coaxial pipe part or other casing 24 externally of the feed pipe 7, at least at the inlet 18 of the feed pipe.

Figure 4:
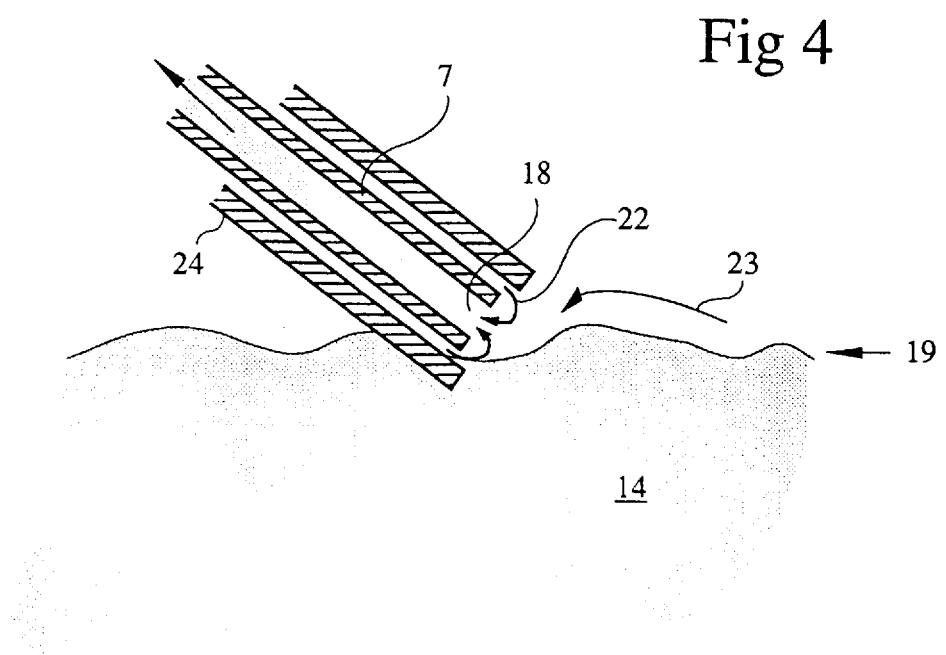

FIG. 4 is further used to show that the direction of the inlet may be varied arbitrarily.

Figure 5:
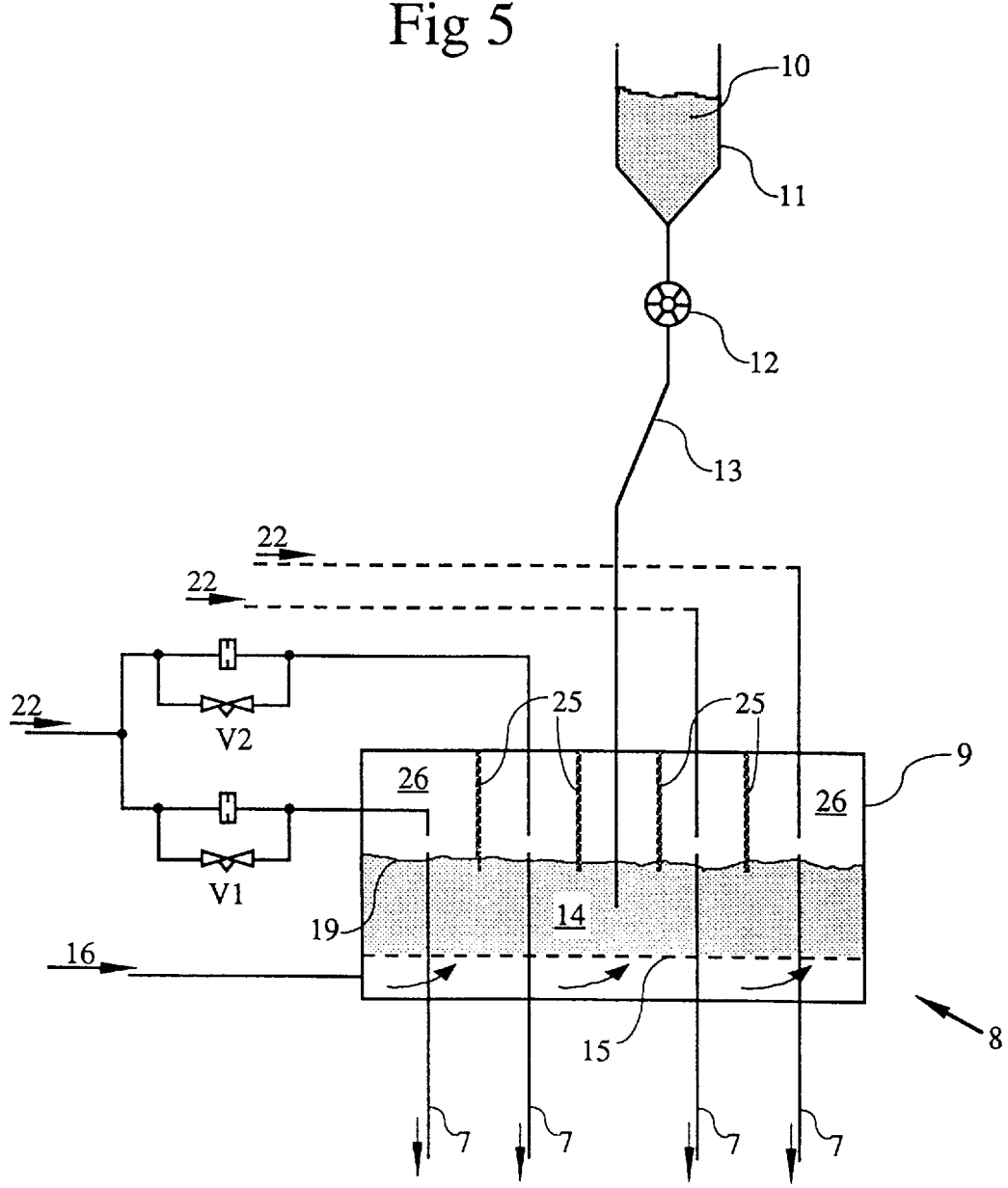
FIG. 5 illustrates an alternative in which a freeboard in the fuel flow distributor is divided into several spaces by arranging walls between each feed pipe.

FIG. 5 illustrates an alternative embodiment of the fuel flow distributor 8, where the freeboard 21 has been divided into several spaces 26 by means of partitions 25. Each such divided space 26 comprises the inlet of a feed pipe. The intention of arranging these spaces 26 is to prevent too lively fluidization of the area at the bed surface 19 at an inlet 18 where a reduction of the fuel flow has been carried out according to the method of the invention. The fluidization around the inlet of a feed pipe 7 is reduced especially if this pipe has been blocked by fuel (i.e., plugged). If fluidization gas is supplied to the bed 14 without these partitions 25 being arranged, the bed surface is fluidized largely equally lively over the entire surface independently of the control of the fuel flow at individual inlets 18.

The extra gas which is supplied to a feed pipe 7, at the inlet 18 thereof, preferably consists of air. Instead of air, another gas may, of course, be used. Suitable gases for this purpose are then primarily flue gas or oxygen-reduced air.

We claim:

1. A method for feeding and controlling the distridution of a particulate fuel to a fluidized combustor bed of a combustor which is supplied fuel via a flow distributor, said method comprising the steps of:

supplying a particulate fuel from a fuel storage means into a vessel associated with said fluid fluid flow distridutor and fluidizing said particulate fuel in the vessel in a bed above a bed bottom in the fuel flow distributor;

location at least two feed pipes with associated inlets close to the surface of the bed in the fuel flow distributor such that fluidization gas leaving the vessel via said feed pipes sipplies fuel to nozzles associated with the feed pipes in the fluidized combustorbed; and supplying additional gas from a separate gas source to the feed pipes at said inlets, whereby fuel flow is controlled by mrans of at least one controlling device for controlling the additional gas being supplied to the inlets of the feed pipes.

2. A method according to claim 1, wherein said controlling device is a valve which influences the fiow of the additional gas being supplied to the inlets of the feed pipes.

3. A method according to claim 1, wherein the inlets of the feed pipes are oriented in an optional direction.

4. A method according to claim 3, wherein the additional gas is injected towards the inlets.

5. A method according to claim 3, wherein the additional gas is supplied via pipes which constitute casings for the inlets of thr feed pipes.

6. A method according to claim 1, wherein the fuel consists of crushed coal or of a mixture of crushed coal and other crushed material.

7. A method according to claim 1, wherein the additional gas which controls the fuel flow through the feed pipes includes one of air, flue gas, and oxygen-reduced air.

8. A fuel flow distributor for feeding and controlling the distribution of a particulate fuel to a fluidized combustor bed of a combustor, the fuel flow distributor comprising:

a vessel for receiving a particulate fuel fed from a fuel storage means and for fluidizing the fuel in the vessel in s bed above a bed bottom in the fuel flow distributor;

at least two feed pipes with associated inlets located close to the surface of the bed in the fuel flow distributor such that fluidization gas leaving the vessel via the feed pipes supplies fuel to nozzles associared with the feed pipes in the bed of the combustor, and a separate gas source for supplying additional gas to thr feed pipes at the inlets, whereby fuel flow is controlled by means of at least one controlling device for controlling the additional gas flow being supplied to the inlets of the feed pipes.

9. A fuel flow distributor according to claim 8, wherein the fluidized combustor bed to which the fuel floe distributor feeds fuel is one of an atmospheric bed, and a pressurized bed.

10. A fuel flow distributor according to claim 8, wherein the inlets of the feed pipes are oriented in an optional direction.

11. A fuel flow distributor according to claim 8, wherein the additional gas is injected towards the inlets.

12. A fuel flow distributor according to claim 8, wherein the additional gas is supplied via pipes which Constitute casings for the inlets.

13. A fuel flow distributor according to claim 8, wherein a freeboard in the fuel flow distribute is divided by partitions into separate spaces, and wherein each of the spaces houses the inlet of at least one feed pipe.

14. A method for feeding and controlling the distridution of a particulate fuel to a fluidized combustor bed of a combustor which is supplied fuel via a flow distributor with the fuel flow distributor including a vessel to which a particulate fuel from a fuel storage means is supplied and fluidized in abed above a bed bottom in the fuel flow distributor and also including least two feed pipes with associated inlets located close to the surface of the bed in the fuel flow distributon such that fluidization gas leaving the vessel via said feed pipes supplies fuel to nozzles associated with the feed pipes in the bed of the combustor, said method inclding;

supplying additional gas from a separate gas source to the feed pipes at said inlets, and thereby controlling fuel flow by controlling gas flow to the inlets of the feed pipes with said additional gas.

* * * * *

UNITED STATES PATENT AND TRADEMARK OFFICE
CERTIFICATE OF CORRECTION

PATENT NO. : 5,868,083
DATED : February 9, 1999
INVENTOR(S): Brännström et al.

It is certified that error appears in the above-identified
patent and that said Letters Patent is hereby corrected as shown below:

```
Column 4, line 55, "change "distridution" to
--distribution--.
     line 60, change "distridutor" to --distributor--.
     line 63, change "location" to --locating--.
     line 66, change "sipplies" to --supplies--.
     line 67, change "combustorbed" to
-- combustor bed--.

Column 5, line 3, change "mrans" to --means--.
     line 27, change "s" to --a--.
     line 31, change "associared" to --associated--.
     line 33, change "thr" to --the--.

Column 6, line 4, change "floe" to --flow--.
     line 13, change "Constitute" to --constitute--.
     line 16, change "distrubute" to --distributor--.
     line 19, change "distridution" to --distribution--.
     line 24, change "abed" to -- a bed--.
     line 25, change "least" to --at least--.
     line 27, change "distributon" to -- distributor--.
```

Signed and Sealed this

Twenty-fifth Day of May, 1999

Attest:

Q. TODD DICKINSON

*Attesting Officer*       *Acting Commissioner of Patents and Trademarks*